United States Patent
Shimano

(10) Patent No.: US 12,388,083 B2
(45) Date of Patent: Aug. 12, 2025

(54) METHOD FOR MANUFACTURING ACTIVE MATERIAL

(71) Applicant: SUMITOMO CHEMICAL COMPANY, LIMITED, Tokyo (JP)

(72) Inventor: Satoshi Shimano, Kyoto (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 19 days.

(21) Appl. No.: 17/908,804

(22) PCT Filed: Mar. 3, 2021

(86) PCT No.: PCT/JP2021/008236
§ 371 (c)(1),
(2) Date: Sep. 1, 2022

(87) PCT Pub. No.: WO2021/177362
PCT Pub. Date: Sep. 10, 2021

(65) Prior Publication Data
US 2023/0094145 A1  Mar. 30, 2023

(30) Foreign Application Priority Data

Mar. 6, 2020 (JP) .................................. 2020-039305

(51) Int. Cl.
*H01M 4/505* (2010.01)
*C01G 53/50* (2025.01)
*H01M 4/525* (2010.01)
*H01M 50/109* (2021.01)

(52) U.S. Cl.
CPC ............ *H01M 4/505* (2013.01); *C01G 53/50* (2013.01); *H01M 4/525* (2013.01); *C01P 2002/50* (2013.01); *C01P 2006/40* (2013.01); *H01M 50/109* (2021.01)

(58) Field of Classification Search
CPC .... H01M 4/505; H01M 4/525; H01M 50/109; C01G 53/50; C01P 2002/50; C01P 2006/40
See application file for complete search history.

(56) References Cited

U.S. PATENT DOCUMENTS

| | | |
|---|---|---|
| 2005/0070184 A1 | 3/2005 | Takeda et al. |
| 2005/0241943 A1 | 11/2005 | Kakuta et al. |
| 2006/0014099 A1 | 1/2006 | Faler et al. |
| 2010/0209697 A1 | 8/2010 | Bowles et al. |
| 2013/0323142 A1 | 12/2013 | Shimano et al. |
| 2019/0067689 A1 | 2/2019 | Hong et al. |

FOREIGN PATENT DOCUMENTS

| | | |
|---|---|---|
| CN | 105244560 A | 1/2016 |
| CN | 110217830 A | 9/2019 |
| CN | 110797602 A | 2/2020 |
| JP | 2003-206132 A | 7/2003 |
| JP | 2005-026088 A | 1/2005 |
| JP | 2012-186150 A | 9/2012 |
| JP | 2019-046795 A | 3/2019 |

OTHER PUBLICATIONS

Japanese Office Action issued in corresponding Japanese Patent Application No. 2020-039305, dated May 9, 2023, with English translation.
International Search Report issued in corresponding International Patent Application No. PCT/JP2021/008236, dated Apr. 27, 2021, with English translation.
English translation of International Preliminary Report on Patentability (IPRP) issued in corresponding International Patent Application No. PCT/JP2021/008236, dated Sep. 15, 2022.
Japanese Office Action issued in corresponding Japanese Patent Application No. 2020-039305, dated Jul. 18, 2023, with English translation.
Extended European Search Report dated Apr. 16, 2024, from corresponding EP Application No. 21764408.7, 8 pages.

*Primary Examiner* — Haidung D Nguyen
(74) *Attorney, Agent, or Firm* — Rimon P.C.

(57) ABSTRACT

A method for manufacturing an active material, the method comprising the following steps:
(1) mixing an activation agent containing one kind or two or more kinds of alkali metal compounds into an electrode mixture containing an active material and a binder;
(2) heating a mixture thus obtained to a temperature higher than or equal to a melting start temperature of the activation agent in an atmosphere having an oxygen partial pressure of 0.3 atm or higher; and
(3) collecting an active material from the mixture after heating.

15 Claims, No Drawings

METHOD FOR MANUFACTURING ACTIVE MATERIAL

CROSS-REFERENCE OF RELATED APPLICATIONS

This application is the U.S. National Phase under 35 U.S.C. § 371 of International Patent Application No. PCT/JP2021/008236, filed on Mar. 3, 2021, which in turn claims the benefit of Japanese Application No. 2020-039305, filed on Mar. 6, 2020, the entire disclosures of which Applications are incorporated by reference herein.

TECHNICAL FIELD

The present invention relates to a method for manufacturing an active material.

BACKGROUND ART

Active materials of a battery contain rare metal components such as cobalt, nickel, manganese, and lithium, and particularly in a positive electrode active material of a non-aqueous electrolyte secondary battery, compounds containing the above-described rare metal components as main components are utilized. In order to preserve resources of the rare metal components, a method for reproducing rare metal components from waste battery materials of secondary batteries has been demanded.

For example, in Patent Literature 1, a method of mixing an electrode mixture with an activation agent containing an alkali metal compound, heating the mixture to decompose a binder, removing the decomposition product and the activation agent by means of water or the like, and collecting an active material, is disclosed. This method is excellent in terms of cost, from the viewpoint that an active material is directly collected from waste battery materials without using an organic solvent.

CITATION LIST

Patent Literature

Patent Literature 1: Japanese Unexamined Patent Application Publication No. 2012-186150

SUMMARY OF INVENTION

Technical Problem

Meanwhile, on the occasion of suitably reutilizing an active material after reproduction, it is required to suppress deterioration of a crystal structure of the active material before and after the reproduction process. When the crystal structure of the active material deteriorates, this leads to a decrease in the charge-discharge capacity, which is not preferable.

The present invention was made in view of the above-described problems, and it is an object of the invention to provide a method for manufacturing an active material, by which it is possible to suppress deterioration of the crystal structure.

Solution to Problem

A method for manufacturing an active material according to the present invention comprises the following steps:

(1) mixing an activation agent containing one kind or two or more kinds of alkali metal compounds into an electrode mixture containing an active material and a binder;

(2) heating a mixture thus obtained to a temperature higher than or equal to a melting start temperature of the activation agent in an atmosphere having an oxygen partial pressure of 0.3 atm or higher; and (3) collecting an active material from the mixture after the heating.

Here, the active material can be a positive electrode active material or can also be a positive electrode active material of a non-aqueous secondary battery.

The active material can be a composite oxide containing one or more kinds of elements selected from the following Element Group 1 and one or more kinds of elements selected from Element Group 2:

Element Group 1: Ni, Co, Mn, Fe, Al, and P
Element Group 2: Li, Na, K, Ca, Sr, Ba, and Mg The active material can be a composite oxide represented by $Li_{1+a}M^2{}_b M^2{}_b M^T{}_c O_{2+d} X_e$.

In the formula, $M^2$ represents at least one or more elements selected from the group consisting of Na, K, Ca, Sr, Ba, and Mg;

$M^1$ represents at least one kind of element selected from the group consisting of Ni, Co, Mn, Fe, Al, and P;

$M^T$ represents at least one element selected from the group consisting of transition metal elements other than Ni, Co, Mn, and Fe;

X represents at least one or more elements selected from the group consisting of non-metal elements except for oxygen 0 and P; and the following are satisfied: $-0.4<a<1.5$, $0 \le b<0.5$, $0 \le c<0.5$, $-0.5<d<1.5$, and $0 \le e<0.5$.

Furthermore, a molar fraction of Ni included in $M^1$ in the composite oxide can be 0.5 or more.

Furthermore, the composite oxide can have a hexagonal crystal structure.

Furthermore, a discharge capacity of the collected active material can be 150 mAh/g or greater.

Furthermore, the at least one kind of alkali metal compound contained in the activation agent can be the same alkali metal element as the alkali metal element contained in the active material.

Furthermore, at least one kind of the alkali metal compound contained in the activation agent can be an alkali metal compound exhibiting alkalinity when dissolved in water.

Furthermore, the alkali metal compound exhibiting alkalinity when dissolved in water can be one or more kinds selected from the group consisting of hydroxides, carbonates, hydrogen carbonates, oxides, peroxides, and superoxides of alkali metals.

Furthermore, the melting start temperature of the activation agent can be 700° C. or lower.

Advantageous Effects of Invention

According to the present invention, an active material can be produced from an electrode mixture while deterioration of the crystal structure is suppressed.

DESCRIPTION OF EMBODIMENTS

Hereinafter, embodiments of the present invention will be described.

The method for manufacturing an active material according to embodiments of the present invention comprises the following steps:
(1) a step of mixing an activation agent containing one kind or two or more kinds of alkali metal compounds into an electrode mixture containing an active material and a binder;
(2) a step of heating a mixture thus obtained to a temperature higher than or equal to a melting start temperature of the activation agent in an atmosphere having an oxygen partial pressure of 0.3 atm or higher; and
(3) a step of collecting an active material from the mixture after the heating.

Hereinafter, each step of the method of collecting an active material from waste battery materials of the present invention will be described in detail.

Step (1): Step of mixing activation agent into electrode mixture First, an electrode mixture is prepared.

<Electrode Mixture>

An electrode mixture is a material containing an active material and a binder, and the active material is bound to each other by the binder. The electrode mixture may further contain a conductive material, and in that case, the active material and the conductive material are bound to each other by the binder.

<Active Material>

The active material may be either a positive electrode active material or a negative electrode active material.

Examples of the positive electrode active material include composite compounds containing lithium, oxygen, fluorine, sodium, magnesium, aluminum, silicon, phosphorus, sulfur, potassium, calcium, titanium, vanadium, chromium, manganese, iron, cobalt, nickel, copper, zinc, gallium, yttrium, niobium, molybdenum, silver, indium, tungsten, and the like as constituent elements.

Furthermore, examples of the negative electrode active material include composite compounds containing lithium, oxygen, fluorine, sodium, magnesium, aluminum, silicon, phosphorus, sulfur, potassium, calcium, titanium, vanadium, chromium, manganese, iron, cobalt, nickel, copper, zinc, gallium, yttrium, niobium, molybdenum, silver, indium, tungsten, and the like as constituent elements.

Incidentally, the active material may be formed from a single compound or may be combination of a plurality of compounds.

Suitable examples of the positive electrode active material include composite compounds containing lithium, oxygen, sodium, potassium, calcium, magnesium, aluminum, phosphorus, sulfur, vanadium, manganese, iron, nickel, copper, cobalt, gallium, molybdenum, indium, tungsten, and the like as constituent elements.

Furthermore, it is suitable that the active material according to the present invention is a positive electrode active material for a non-aqueous secondary battery. An example of the positive electrode active material for a non-aqueous secondary battery is a composite oxide containing one or more kinds of elements selected from the following Element Group 1 and one or more kinds of metals selected from Element Group 2:

Element Group 1: Ni, Co, Mn, Fe, Al, and P
Element Group 2: Li, Na, K, Ca, Sr, Ba, and Mg Among these, a lithium transition metal composite oxide in which Element Group 1 is one or more kinds selected from Ni, Co, Mn, Fe, and P, and Element Group 2 is Li, or a sodium transition metal composite oxide in which Element Group 1 is one or more kinds selected from Ni, Co, Mn, Fe, and P, and Element Group 2 is Na, is preferred, and particularly a lithium transition metal composite oxide is preferred.

Specifically, examples of the lithium transition metal composite oxide include $LiCoO_2$, $LiNiO_2$, $Li(Ni, Co)O_2$, $Li(Ni, Co, Al)O_2$, $Li(Ni, Mn)O_2$, $Li(Ni, Mn, Co)O_2$, $LiMn_2O_4$, $Li(Mn, Fe)_2O_4$, $Li_2MnO_3$, $Li_2NiO_3$, $Li_2(Ni, Mn)O_3$, $LiFePO_4$, and $LiMnPO_4$, and these can be used singly or as a mixture of two or more kinds thereof.

Specific examples of the sodium transition metal composite oxide include $NaCoO_2$, $NaNiO_2$, $Na(Ni, Co)O_2$, $Na(Ni, Mn)O_2$, $Na(Ni, Mn, Co)O_2$, $Na(Fe, Ni, Mn)O_2$, $NaMn_2O_4$, $Na(Mn, Fe)_2O_4$, $NaFePO_4$, and $NaMnPO_4$, and these can be used singly or as a mixture of two or more kinds thereof.

Particularly, it is suitable that the composite oxide is represented by $Li_{1+a}M^2{}_bM^1{}_cM^T{}_cO_{2+d}X_e$ (formula A).

In the formula A, $M^2$ represents at least one or more elements selected from the group consisting of Na, Ca, Sr, Ba, and Mg; $M^1$ represents at least one kind of element selected from the group consisting of Ni, Co, Mn, Fe, Al, and P; $M^T$ represents at least one element selected from the group consisting of transition metal elements other than Ni, Co, Mn, and Fe; X represents at least one or more elements selected from the group consisting of non-metal elements except for oxygen 0 and P; and the following are satisfied: $-0.4<a<1.5$, $0 \le b<0.5$, $0 \le c<0.5$, $-0.5<d<1.5$, and $0 \le e<0.5$.

Examples of X include F, Cl, Br, I, S, Se, Te, and N.

A molar fraction of Ni included in $M^1$ in the composite oxide can be 0.5 or more and may be 0.6 or more, 0.7 or more, or 0.8 or more.

The crystal structure of the composite oxide as the active material is not particularly limited; however, a layered structure exemplifies a preferred crystal structure. More preferably, a hexagonal or monoclinic crystal structure is preferred.

The hexagonal crystal structure belongs to any one space group selected from the group consisting of P3, $P3_1$, $P3_2$, R3, P-3, R-3, P312, P321, $P3_112$, $P3_121$, $P3_212$, $P3_221$, R32, P3m1, P31m, P3c1, P31c, R3m, R3c, P-31m, P-31c, P-3 m1, P-3c1, R-3m, R-3c, P6, $P6_1$, $P6_5$, $P6_2$, $P6_4$, $P6_3$, P-6, P6/m, $P6_3/m$, P622, $P6_122$, $P6_522$, $P6_222$, $P6_422$, $P6_322$, P6 mm, P6cc, $P6_3cm$, $P6_3mc$, P-6m2, P-6c2, P-62m, P-62c, P6/mmm, P6/mcc, $P6_3/mcm$, and $P6_3/mmc$.

The monoclinic crystal structure belongs to any one space group selected from the group consisting of P2, $P2_1$, C2, Pm, Pc, Cm, Cc, P2/m, $P2_1/m$, C2/m, P2/c, $P2_1/c$, and C2/c.

In addition, it is preferable that the crystal structure belongs to the space group of R-3m included in the hexagonal crystal structure or C2/m included in the monoclinic crystal structure.

Incidentally, the crystal structure of the active material is identified from a powder X-ray diffraction pattern obtainable by powder X-ray diffraction measurement using $CuK\alpha$ radiation as a radiation source.

A particle size of the active material in the electrode mixture is not particularly limited. Usually, the particle size is about 0.001 to 100 μm. Incidentally, a particle size distribution of the active material can be measured by using a laser diffraction scattering particle size distribution measuring apparatus (for example, MASTERSIZER-2000 manufactured by Malvern Panalytical, Ltd.). From the obtained particle size distribution, a volume-based cumulative particle size distribution curve is produced, and the value of the particle size (D50) at the time of 50% accumulation from the smaller particle side can be referred to as the average particle size of the powder. Furthermore, the particle size of primary particles of the active material can be measured as an arithmetic mean of equivalent circle diameters in an electron microphotograph.

<Conductive Material>

Examples of the conductive material include a metal-based conductive material such as metal particles, and a carbon-based conductive material formed from a carbon material.

Specific examples of the carbon-based conductive material include a graphite powder, carbon black (for example, acetylene black), and fibrous carbon materials (for example, graphitized carbon fibers and carbon nanotubes).

The carbon-based conductive material may be a single carbon material or may be a combination of a plurality of carbon materials.

Furthermore, a specific surface area of the carbon material used as the carbon-based conductive material can be usually 0.1 to 500 $m^2/g$.

In that case, the conductive material can be formed only from a carbon-based conductive material having a specific surface area of 30 $m^2/g$ or more and may be carbon black having a specific surface area of 30 $m^2/g$ or more or may be acetylene black having a specific surface area of 30 $m^2/g$ or more.

Incidentally, in the case of using an activation agent containing an alkali metal compound having oxidizability as will be described below, the rate of an oxidation treatment of the carbon-based conductive material can be increased, and even a carbon material having a smaller specific surface area may also be oxidation-treated.

<Binder>

An example of the binder (binder before activation treatment) contained in the electrode mixture is a thermoplastic resin, and specific examples include fluororesins such as polyvinylidene fluoride (hereinafter, may be referred to as PVdF), polytetrafluoroethylene (hereinafter, may be referred to as PTFE), an ethylene tetrafluoride-propylene hexafluoride-vinylidene fluoride-based copolymer, a propylene hexafluoride-vinylidene fluoride-based copolymer, and an ethylene tetrafluoride-perfluorovinyl ether-based copolymer; polyolefin resins such as polyethylene and polypropylene; a styrene-butadiene copolymer (hereinafter, may be referred to as SBR), and the binder may also be a mixture of two or more kinds of these.

The blending amounts of the active material, conductive material, and binder in the electrode mixture are not particularly limited. The blending amount of the binder can be 0.5 to 30 parts by weight or may be 1 to 5 parts by weight, with respect to 100 parts by weight of the positive electrode active material. The blending amount of the conductive agent may be 0; however, the blending amount can be 0 to 50 parts by weight or may be 1 to 10 parts by weight, with respect to 100 parts by weight of the positive electrode active material.

Such an electrode mixture can be obtained by separating and collecting the electrode mixture from a waste electrode having a current collector and an electrode mixture layer.

The "waste electrode" can be an electrode collected from a discarded battery, and a waste material of an electrode generated in the processes for manufacturing electrodes and batteries. The discarded battery may be a used battery or may be an unused but non-standard battery. Furthermore, the waste material of an electrode can be an end part of an electrode generated in the production process for a battery, and a non-standard electrode. Furthermore, disposed articles of an electrode mixture that is not stuck to a current collector, which are produced in an electrode mixture manufacturing process, can also be used.

An electrode has a current collector, which is a metal foil such as an aluminum foil or a copper foil; and an electrode mixture layer provided on this current collector. The electrode mixture layer may be provided on one surface of the current collector or may be provided on both surfaces.

Examples of a method of separating an electrode mixture from an electrode having an electrode mixture layer and a current collector, include a method of mechanically peeling the electrode mixture layer from the current collector (for example, a method of scraping off the electrode mixture from the current collector), a method of causing a solvent to penetrate into the interface between the electrode mixture layer and the current collector and peeling the electrode mixture layer from the current collector, and a method of dissolving the current collector by using an alkaline or acidic aqueous solution and separating the electrode mixture layer. Preferred is a method of mechanically peeling the electrode mixture layer from the current collector.

The electrode may be either a positive electrode or a negative electrode. A positive electrode mixture can be collected from the positive electrode, and a negative electrode mixture can be collected from the negative electrode. When a positive electrode mixture is used, a positive electrode active material can be collected, and when a negative electrode mixture is used, a negative electrode active material can be collected. The method for manufacturing an active material of the present invention is suitably applied when collecting a positive electrode active material from a positive electrode mixture, and among positive electrode active materials, the method is suitably applied to a positive electrode active material of a non-aqueous secondary battery.

Subsequently, an activation agent containing one kind or two or more kinds of alkali metal compounds is mixed into the prepared electrode mixture.

The mixing of the electrode mixture and the activation agent may be either dry mixing or wet mixing or may be a combination of these mixing methods, and the order of mixing is also not particularly limited.

At the time of mixing, it is preferable to carry out a step of performing pulverization and mixing by using a mixing apparatus equipped with mixing media such as balls, and accordingly, the mixing efficiency can be enhanced.

From the viewpoint that mixing can be performed more conveniently, dry mixing is preferable, and for the drying mixing, a V-type mixer, a W-type mixer, a ribbon mixer, a drum mixer, a powder mixer equipped with a stirring blade inside the mixer, a ball mill, a vibration mill, or a combination of these apparatuses can be used.

Specific examples of the powder mixer equipped with a stirring blade inside the mixer as a suitable powder mixing apparatus include a Loedige mixer (manufactured by MATSUBO Corporation).

Hereinafter, the activation agent used for the present step will be described in detail.

<Activation Agent>

The activation agent contains one kind or two or more kinds of alkali metal compounds. When an alkali metal compound comes into contact with an active material, the alkali metal compound can activate the active material. When the alkali metal compound in the activation agent particularly contains a molten portion, as the contact property between this molten portion and the active material is enhanced, activation of the active material is further promoted.

Furthermore, the electrode mixture may contain a fluorine-containing compound that is derived from a binder and/or a liquid electrolyte; however, when the fluorine-containing compound is brought into contact with the activation agent, since the fluorine component is stabilized as an alkali metal fluoride, generation of corrosive gas such as hydrogen fluoride can be suppressed. Meanwhile, even from the viewpoint that hydrogen fluoride lowers the activity of the active material, it is desirable to prevent generation of hydrogen fluoride.

The proportion of the alkali metal compound in the activation agent is appropriately set in consideration of the type of the alkali metal compound, the type of the active material as a target, and the like; however, the proportion is usually 50% by weight or more, and preferably 70% by weight or more (including 100% by weight), with respect to the total weight of the activation agent.

Examples of the alkali metal compound that is a component of the activation agent, include hydroxides, borates, carbonates, oxides, peroxides, superoxides, nitrates, phosphates, sulfates, chlorides, vanadates, bromates, molybdates, and tungstates of alkali metals. These can be used singly or as a combination of a plurality of the compounds as a component of the activation agent.

The alkali metal element that constitutes the alkali metal compound may be an alkali metal element, and at least one selected from the group consisting of lithium, sodium, and potassium is preferable. Incidentally, when two or more kinds of alkali metal compounds are contained as a component of the activation agent, an alkali metal compound containing different alkali metal elements may be used.

Specific examples of a suitable alkali metal compound include;

hydroxides such as LiOH, NaOH, KOH, RbOH, and CsOH;
borates such as $LiBO_2$, $NaBO_2$, $KBO_2$, $RbBO_2$, and $CsBO_2$;
carbonates such as $Li_2CO_3$, $Na_2CO_3$, $K_2CO_3$, $RbCO_3$, and $CsCO_3$;
oxides such as $Li_2O$, $Na_2O$, $K_2O$, $Rb_2O$, and $Cs_2O$;
peroxides such as $Li_2O_2$, $Na_2O_2$, $K_2O_2$, $Rb_2O_2$, and $Cs_2O_2$;
superoxides such as $LiO_2$, $NaO_2$, $KO_2$, $RbO_2$, and $CsO_2$;
nitrates such as $LiNO_3$, $NaNO_3$, $KNO_3$, $RbNO_3$, and $CsNO_3$;
phosphates such as $Li_3PO_4$, $Na_3PO_4$, $K_3PO_4$, $Rb_3PO_4$, and $Cs_3PO_4$;
sulfates such as $Li_2SO_4$, $Na_2SO_4$, $K_2SO_4$, $Rb_2SO_4$, and $Cs_2SO_4$;
chlorides such as LiCl, NaCl, KCl, RbCl, and CsCl;
bromides such as LiBr, NaBr, KBr, RbBr, and CsBr;
vanadates such as $LiVO_3$, $NaVO_3$, $KVO_3$, $RbVO_3$, and $CsVO_3$;
molybdates such as $Li_2MoO_4$, $Na_2MoO_4$, $K_2MoO_4$, $Rb_2MoO_4$, and $CsMoO_4$; and
tungstates such as $Li_2WO_4$, $Na_2WO_4$, $K_2WO_4$, $Rb_2WO_4$, and $CsWO_4$.

Here, in order to further increase the activation effect for the active material, the at least one kind of alkali metal compound contained in the activation agent can be the same alkali metal element as the alkali metal element contained in the active material in the electrode mixture.

That is, when the active material in the electrode mixture is a lithium composite oxide, the alkali metal compound (in the case of two or more kinds, at least one kind thereof) in the activation agent can be a lithium compound. Suitable examples of the lithium compound include LiOH, $LiBO_2$, $Li_2CO_3$, $Li_2O$, $Li_2O_2$, $LiO_2$, $LiNO_3$, $Li_3PO_4$, $Li_2SO_4$, LiCl, $LiVO_3$, LiBr, $Li_2MoO_4$, and $Li_2WO_4$.

Furthermore, when the active material in the electrode mixture is a sodium composite oxide, the alkali metal compound (in the case of two or more kinds, at least one kind thereof) in the activation agent can be a sodium compound. Suitable examples of the sodium compound include NaOH, $NaBO_2$, $Na_2CO_3$, $Na_2O$, $Na_2O_2$, $NaO_2$, $NaNO_3$, $Na_3PO_4$, $Na_2SO_4$, NaCl, $NaVO_3$, NaBr, $Na_2MoO_4$, and $Na_2WO_4$.

The activation agent may contain a compound other than the alkali metal compound as necessary. Examples of the compound other than the alkali metal compound include alkaline earth metal compounds containing alkaline earth metal elements such as magnesium, calcium, and barium. The alkaline earth metal compound is contained in the activation agent together with the alkali metal compound, for the purpose of controlling the melting start temperature of the activation agent.

Furthermore, the content of the compound other than the alkali metal compound in the activation agent is selected to the extent that does not noticeably suppress the effect originating from the above-mentioned molten alkali metal compound, and the content is less than 50% by weight of the total weight of the activation agent.

The amount of addition of the activation agent in a mixture of the electrode mixture and the activation agent is preferably 0.001 to 100 times, and more preferably 0.05 to 1 time, with respect to the weight of the active material contained in the electrode mixture.

With regard to the number of moles of the alkali compound in the activation agent in the mixture of the electrode mixture and the activation agent, the alkali compound can be added such that when the number of moles of the active material (for example, formula A) contained in the electrode mixture is taken as 1, the number of moles of alkali atoms is 0.001 to 200 times.

By appropriately controlling the proportion of the activation agent in the mixture, the cost required for collecting the active material from the electrode mixture can be reduced, and the rate of the oxidation decomposition treatment of the carbon-based conductive material or the binder can be increased. Furthermore, the effect of preventing the generation of corrosive gas in the activation treatment step can be enhanced, and the discharge capacity of a battery produced by using the obtained active material can be further increased.

Furthermore, it is preferable that at least one kind of the alkali metal compounds contained in the activation agent is an alkali metal compound exhibiting alkalinity when dissolved in water. An activation agent containing such an alkali metal compound is such that when dissolved in pure water, the pH of the solution is greater than 7. Hereinafter, such an activation agent may be referred to as "alkaline activation agent".

According to the present invention, since the generation of corrosive gas in the heating step can be further suppressed by using an alkaline activation agent, the discharge capacity of a battery produced by using the collected active material can be further increased. Furthermore, the treatment rate for the carbon-based conductive material or the binder can be increased by using an alkaline activation agent.

Examples of the alkali metal compound that is contained in the alkaline activation agent and exhibits alkalinity when dissolved in water, include hydroxides, carbonates, hydrogen carbonates, oxides, peroxides, and superoxides of alkali metals. Specific examples include LIOH, NaOH, KOH, RbOH, CsOH; $Li_2CO_3$, $Na_2CO_3$, $K_2CO_3$, $RbCO_3$, $CsCO_3$; $LiHCO_3$, $NaHCO_3$, $KHCO_3$, $RbHCO_3$, $CsHCO_3$; $Li_2O$, $Na_2O$, $K_2O$, $Rb_2O$, $Cs_2O$; $Li_2O_2$, $Na_2O_2$, $K_2O_2$, $Rb_2O_2$, $Cs_2O_2$; $LiO_2$, $NaO_2$, $K_{O2}$, $RbO_2$, and $CsO_2$. One kind or two or more kinds of these may be contained in the activation agent.

Furthermore, when the conductive material contained in the electrode mixture is a carbon-based conductive material, at least one kind of the alkali metal compounds contained in the activation agent may be an alkali metal compound having oxidizability for oxidatively decomposing the carbon-based conductive material at the temperature of the activation treatment step. Incidentally, an activation agent containing such an alkali metal compound may be hereinafter referred to as "activation agent having oxidizability".

When an activation agent having such oxidizability is used, oxidation of the conductive material, which is a carbon material, into carbon dioxide is promoted, the activation agent particularly exhibits an effect in promoting oxidation of the binder, which is a hydrocarbon material, into carbon dioxide and water vapor, the discharge capacity of a battery produced by using the obtained active material can be further increased, and an effect of preventing the generation of corrosive gas during the activation treatment step may be enhanced.

Examples of the alkali metal compound having oxidizability necessary for oxidizing a carbon-based conductive material and a hydrocarbon into carbon dioxide and water vapor, include peroxides, superoxides, nitrates, sulfates, vanadates, and molybdates of alkali metals. These may be used singly or as a combination of two or more kinds thereof.

Specific examples include $Li_2O_2$, $Na_2O_2$, $K_2O_2$, $Rb_2O_2$, $Cs_2O_2$; $LiO_2$, $NaO_2$, $KO_2$, $RbO_2$, $CsO_2$; $LiNO_3$, $NaNO_3$, $KNO_3$, $RbNO_3$, $CsNO_3$; $Li_2SO_4$, $Na_2SO_4$, $K_2SO_4$, $Rb_2SO_4$, $Cs_2SO_4$; $LiVO_3$, $NaVO_3$, $KVO_3$, $RbVO_3$, $CsVO_3$; $Li_2MoO_4$, $Na_2MoO_4$, $K_2MoO_4$, $Rb_2MoO_4$, and $CsMoO_4$.

The details of the oxidizability of these alkali metal compounds are described in Japanese Unexamined Patent Application Publication No. 2012-186150.

Step (2): <Step of Heating Mixture>

The heating step is a step of heating the mixture obtained in step (1) (hereinafter, may be referred to as "mixture before heating") to a temperature higher than or equal to the melting start temperature of the activation agent in an atmosphere having an oxygen partial pressure of 0.3 atm or higher.

Incidentally, the "melting start temperature (Tmp) of activation agent" means the lowest temperature at which a portion of the activation agent exhibits a liquid phase.

According to the present invention, the melting start temperature (Tmp) of the activation agent is a value determined by a differential thermal analysis (DTA). That is, 5 mg of the mixture is subjected to a differential thermal analysis (DTA, measurement conditions: rate of temperature increase: 10° C./min), and the temperature at which the DTA signal indicates an endothermic peak is designated as the melting start temperature (Tmp).

The melting start temperature (Tmp) of the activation agent is preferably 700° C. or lower and may be 600° C. or lower. There is no lower limit for the melting start temperature (Tmp) of the activation agent; however, the lower limit may be, for example, 150° C.

Furthermore, the melting point of the activation agent means the lowest temperature at which a portion of the activation agent exhibits a liquid phase when only the activation agent is heated. As the electrode mixture and the activation agent are mixed, the melting start temperature of the activation agent is lower than the melting point of the activation agent.

According to the present invention, the melting point of the activation agent is a value determined by a differential thermal analysis (DTA). Specifically, 5 mg of the activation agent is subjected to a differential thermal analysis (DTA, measurement conditions: rate of temperature increase: 10° C./min), and a temperature at which the DTA signal indicates an endothermic peak is designated as the melting point of the activation agent.

It is acceptable when the atmosphere for the heating has an oxygen partial pressure of 0.3 atm or higher, and the oxygen partial pressure may be 0.4 atm or higher, may be 0.5 atm or higher, may be 0.6 atm or higher, may be 0.7 atm or higher, may be 0.8 atm or higher, may be 0.9 atm or higher, or may be 1.0 atm or higher. Incidentally, 1 atm is 101325 Pa. There is no particular limitation on the total pressure of the atmosphere, and the atmosphere can be atmospheric pressure; however, the atmosphere may be a reduced pressure atmosphere or may be a pressurized atmosphere.

Examples of the gas other than oxygen in the atmosphere include nitrogen, argon, and carbon dioxide.

In step (2), the following action occurs as a result of heating the mixture to a temperature higher than or equal to the melting start temperature of the activation agent in an atmosphere having an oxygen partial pressure of 0.3 atm or higher as described above.

As the activation agent in a fused state comes into contact with an active material in an atmosphere having a higher oxygen partial pressure, deterioration of the crystal structure of the active material can be suppressed. Furthermore, depending on cases, a crystal structure repairing action can also be obtained.

Furthermore, when the activation agent in a fused state comes into contact with a carbon-based conductive material or a binder, the rate of oxidative decomposition of the conductive material and the binder is increased. In addition, when the activation agent in a fused state comes into contact with a fluorine compound derived from a binder and a liquid electrolyte, the fluorine component is stabilized as an alkali metal fluoride and prevents the generation of hydrogen fluoride, which is a corrosive gas, and deterioration of the crystal structure of the active material is suppressed.

Moreover, when the activation agent contains the same alkali metal as that of the active material, it is also possible to supply the alkali metal that is insufficient for the active material.

The temperature of the heating step and the retention time at that temperature can be appropriately regulated by means of the respective types and combinations of conductive material, binder, and activation agent constituting the electrode mixture, and the alkali metal compounds and other compounds, which are contained in the active material. Usually, the temperature is in the range of 100° C. to 1500° C., and the retention time is about 10 minutes to 24 hours.

It is preferable that the temperature is a temperature higher than the melting point of the alkali metal compound contained in the activation agent. Incidentally, regarding the melting point of the alkali metal compound, when a plurality of compounds is mixed, the melting point may become lower than the melting point of a simple substance of each of the compounds. When the activation agent contains two or more kinds of alkali metal compounds, the eutectic point is considered as the melting point of the alkali metal compound.

After the heating step, if necessary, the mixture can be cooled to any temperature such as, for example, about room temperature.

Step (3): <Step of Collecting Active Material>

Step (3): step of collecting an active material is a step of collecting the active material from the mixture after the heating step of step (2).

In the mixture that has been subjected to the heating step, components derived from the activation agent (alkali metal compound and the like), undecomposed conductive material or binder, and other undecomposed product of the electrode mixture, in addition to the active material. Furthermore, when a liquid electrolyte containing a fluorine component is contained in the electrode mixture, the mixture may also contain the fluorine component derived from the electrolyte.

Examples of a method of separating and collecting the active material from the mixture that has been subjected to the heating step include a slurrification and solid-liquid separation method of adding a solvent such as water to the mixture to slurrify the mixture and then performing solid-liquid separation; and a vaporization and separation method of heating the mixture to vaporize components other than the active material and separating the active material.

Hereinafter, the slurrification and solid-liquid separation method, which is a suitable method for the active material collecting step, will be described in detail.

<Slurrification and Solid-Liquid Separation Method>

The active material collecting step according to the slurrification and solid-liquid separation method includes a slurrification step of adding a solvent to the mixture obtained after the activation treatment step to slurrify the mixture; a solid-liquid separation step of separating the slurry into a solid phase and a liquid phase; and a drying step of drying the solid phase after the solid-liquid separation.

This method is a method particularly appropriate for collecting an active material that is insoluble in water.

The slurrification step is a step of adding a solvent to the mixture after the activation treatment to produce a slurry.

There is no limitation on the solvent used for the slurrification step as long as it is a solvent capable of dissolving components other than the active material contained in the mixture. The solvent is preferably water, which is inexpensive and is industrially easily usable. In order to increase the solubility of water-soluble components or to increase the treatment rate, the pH may be adjusted by adding components other than water.

In the slurrification step, a slurry containing a solid phase mainly containing the active material and a liquid phase containing water-soluble components other than the active material is produced. Incidentally, in the liquid phase, an alkali metal component derived from an activation agent and/or a fluorine component derived from a binder and a liquid electrolyte are contained.

The amount of the solvent that is added to the mixture is appropriately determined in consideration of the respective amounts of the active material and water-soluble components other than the active material contained in the mixture.

The slurry formed in the slurrification step is next supplied to the solid-liquid separation step. The solid-liquid separation step is a step of separating the slurry into a liquid phase and a solid phase. As the solid-liquid separation method, any conventionally known method may be used, and examples include filtration and a centrifugation method.

The drying step is a step of drying the active material obtained after the solid-liquid separation step to remove the solvent (water).

The temperature for drying is preferably 100° C. or higher in order to remove the solvent (water). It is preferable to set the temperature to 150° C. or higher in order to remove water more sufficiently. Particularly at a temperature of 250° C. or higher, the discharge capacity of a battery produced by using the obtained active material is further increased, which is preferable. The temperature for the drying step may be constant or may be varied stepwise or continuously.

After drying, the active material may be recalcined in an oxygen-containing atmosphere. The atmosphere for recalcination is, for example, an air atmosphere. Furthermore, similarly to the heating step, recalcination may be carried out in an atmosphere having an oxygen partial pressure of 0.3 atm or higher.

Furthermore, the temperature for recalcination can be set to 100° C. to 1500° C.

Furthermore, the retention time for recalcination can be set to 1 minute to 24 hours.

The active material obtained from the battery material mixture by using the method for manufacturing an active material of the present invention, can be reutilized similarly to an unused active material. A method for manufacturing an electrode and a battery by using an active material is well known.

The discharge capacity of the collected active material can be 150 mAh/g or greater.

It is preferable that a molar fraction of an alkali metal with respect to a transition metal in the manufactured active material is equal to or larger than the molar ratio in the active material in the electrode mixture. By increasing the fraction of the alkali metal, the discharge capacity of the battery produced by using the obtained active material can be increased.

EXAMPLES

Hereinafter, the present invention will be described in more detail by way of Examples; however, the present invention is not limited to the following Examples.

Measurement of the physical properties of the active material (before manufacturing of the electrode mixture), and a charge and discharge test using a battery that used the active material as a positive electrode active material were carried out as follows.

(1) Composition Analysis

A sample was dissolved in hydrochloric acid, and then a composition analysis was carried out using inductively coupled plasma emission spectroscopy (hereinafter, may be referred to ICP-AES) (SPS3000 manufactured by SII Nanotechnology, Inc. was used).

(2) Powder X-Ray Diffraction Measurement

For the powder X-ray diffraction measurement of a sample, a powder X-ray diffraction measurement apparatus X'Pert PRO manufactured by Spectris plc was used. For a radiation source for X-radiation, a CuKα radiation source was used. An active material was packed in a dedicated holder, and measurement was performed at a diffraction angle in the range of 2θ=10° to 90° to obtain a powder X-ray diffraction pattern. Based on the obtained powder X-ray diffraction pattern, refinement of the lattice constant according to a least square method was performed using PDXL2 software manufactured by Rigaku Corporation, and the interplanar spacing of the (110) plane was obtained.

Measuring apparatus: Powder X-ray diffraction measuring apparatus X'Pert PRO manufactured by Spectris plc X-ray generator: CuKα radiation source, voltage 45 kV, current 40 mA Slit: 1°
Scan step: 0.02 deg
Scan range: 10 to 90 deg
Scan speed: 4 deg/min
X-ray detector: One-dimensional semiconductor detector
Measurement atmosphere: air atmosphere
Sample stand: Glass sample plate for dedicated use
(3) Measurement of pH of Activation Agent 3.5 g of an activation agent was introduced into 70 g of pure water, the mixture was sufficiently stirred by using a stirrer, and the pH was measured by using a pH meter based on a glass electrode.

(4) Measurement of Melting Start Temperature of Activation Agent by a Differential Thermal Analysis (DTA)

5 mg of a mixture of an electrode mixture and an activation agent was subjected to a differential thermal analysis (DTA, measurement conditions: rate of temperature increase: 10° C./min), and a temperature at which the DTA signal indicated an endothermic peak was designated as melting start temperature (Tmp).

Measurement conditions for differential thermal analysis (DTA)
Apparatus: Simultaneous thermogravimetric-differential thermal analyzer (TG/DTA6200) manufactured by Seiko Instruments, Inc.
Pan: Platinum
Initial sample amount: 5 mg
Atmosphere: Air
Rate of temperature increase: 10° C./min (5) Charge and Discharge Test
1. Production of electrode (positive electrode)

In order to measure the discharge capacity of an active material, an electrode (positive electrode) was produced by the following procedure.

Each active material, a binder (PVdF #1100 (manufactured by KUREHA CORPORATION)), and a conductive material (acetylene black (manufactured by Denki Kagaku Kogyo Kabushiki Kaisha, Product No.: DENKA BLACK HS100) were mixed such that the weight ratio of active material:binder:conductive material was 92:3:5 in each case, and the mixture was kneaded in an agate mortar to produce a positive electrode mixture paste.

Incidentally, as a binder solution, an NMP solution in which the binder PVdF was dissolved was used, and the binder solution was prepared by adding NMP such that the sum of the weights of the active material, the conductive material, and the binder in the positive electrode mixture paste was 50% by weight.

The positive electrode mixture paste was applied on an Al foil current collector (3×5 cm) such that the amount of the electrode mixture was 3 mg/cm², and then the paste was vacuum-dried at 150° C. for 8 hours to obtain a positive electrode.

2. Production of Battery

A non-aqueous electrolyte secondary battery (coin type battery R2032) was produced by combining the above-mentioned positive electrode, a liquid electrolyte, a separator, and a negative electrode. Incidentally, assembling of the battery was performed in an argon atmosphere in a glove box.

As the liquid electrolyte, one obtained by dissolving $LiPF_6$ as an electrolyte to a concentration of 1 mol/liter in a mixed solvent in which ethylene carbonate and diethyl carbonate were mixed at a volume ratio of 30:70, respectively, was used.

As the separator, a laminated film separator in which a heat-resistant porous layer was laminated on a porous film made of polyethylene, was used. Furthermore, metal lithium was used as the negative electrode.

3. Charge and Discharge Test

A charge and discharge test was performed by using the produced coin type battery, under the following conditions while being maintained at 25° C. In the charge and discharge test, the discharge capacity was measured by varying the discharge current at the time of discharge.

Maximum charging voltage: 4.3 V
Charging time: 8 hours
Charging current: 40 mA/g-active material (charging current per 1 g of active material was 40 mA)

At the time of discharging, the minimum discharging voltage was set to be constant at 2.5 V, and discharging was carried out by varying the discharging current in each cycle as follows.

Discharge of first cycle (0.2 C): Discharging current 40 mA/g-active material
Discharge of second cycle (0.2 C): Discharging current 40 mA/g-active material
Discharge of third cycle (1 C): Discharging current 200 mA/g-active material
Discharge of fourth cycle (2 C): Discharging current 400 mA/g-active material
Discharge of fifth cycle (5 C): Discharging current 1000 mA/g-active material
Discharge of sixth cycle (10 C): Discharging current 2000 mA/g-active material Incidentally, it is shown that as the discharge capacity at 0.2 C is larger, a higher rated capacity is obtained, and as the discharge capacity at 5 C is larger, higher output characteristics are obtained.

Examples and Comparative Examples

A. Production of Positive Electrode a

As the active material, a positive electrode active material in which the composition was $Li_{1.06}Ni_{0.80}Co_{0.11}Mn_{0.09}O_2$ and the crystal structure was R-3m, was used. The discharge capacity at 0.2 C as measured in a charge and discharge test using a coin type battery that used this active material (unutilized active material) as the positive electrode active material, was 184 mAh/g.

Furthermore, as another active material, a positive electrode active material in which the composition was $Li_{1.04}Ni_{0.34}Co_{0.33}Mn_{0.33}O_2$ and the crystal structure was R-3m, was used. The discharge capacity at 0.2 C as measured in a charge and discharge test using a coin type battery that used this active material (unutilized active material) as the positive electrode active material, was 150 mAh/g.

As the conductive material, acetylene black HS100 (manufactured by Denki Kagaku Kogyo Kabushiki Kaisha) was used.

As the binder and the solvent, NMP solvent was further additionally introduced into an NMP solution (manufactured by KUREHA CORPORATION) including 12% by weight of PVdF #1100, which was the binder, to obtain a predetermined ratio.

The mass ratio of the active material, the binder, and the conductive material in the positive electrode mixture was set to 92:3:5. The blending amount of the solvent was set to 50% by mass with respect to the total of the positive electrode mixture paste.

The positive electrode mixture paste was applied on an aluminum foil 1085 (manufactured by Nippon Foil Mfg. Co., Ltd.) for a lithium ion secondary battery positive electrode current collector, the aluminum foil having a thickness of 20 μm, by using a doctor blade type coater, the paste was dried, and a positive electrode A was obtained. The amount of the electrode mixture on the aluminum foil was 20 mg/cm²

B. Collection of Electrode Mixture from Positive Electrode a

The electrode mixture was mechanically scraped off from the positive electrode A to peel off the electrode mixture from the current collector.

C. Activation Agent Mixing Step

A predetermined quantity ratio of an activation agent (one or a plurality of alkali metal compounds) was added to the peeled electrode mixture, subsequently the materials were mixed by using a mortar, and a mixture was obtained. The composition of the activation agent, the number of moles of each alkali metal compound with respect to 1 mol of the active material in the electrode mixture, the pH of the activation agent, and the melting start temperature of the activation agent separately measured in the state of the mixture are shown in Table 1.

D. Heating Step

The obtained mixture (mixture before activation treatment) was placed in a calcination vessel made of alumina and was installed in an electric furnace. The mixture was heated to a predetermined temperature in an oxygen concentration-containing atmosphere at a predetermined concentration at atmospheric pressure. The retention time at that temperature was set to 4 hours, the heating rate to that temperature was set to 250° C./hour, and cooling to room temperature was performed by natural cooling. The adjustment of the concentration of oxygen in the atmosphere was carried out by adding additional oxygen to air. The heating temperature, total pressure, oxygen concentration, and oxygen partial pressure are shown in Table 1.

E. Active Material Collecting Step

After the activation treatment, the mixture was pulverized, water was added thereto to slurrify the mixture, the slurry was stirred, and then decantation was carried out. Subsequently, the slurry was filtered to separate a solid phase. The obtained solid phase was vacuum-dried at 100° C.

For the collected active material (active material after treatment) and the active material before manufacturing the electrode A (active material before treatment), the (110) interplanar spacing was measured by powder X-ray diffraction measurement, and the discharge capacity by a charge and discharge test was measured.

The conditions are shown in Table 1, and the (110) interplanar spacing and the discharge capacity at 0.2 C of the active material before treatment and the active material after treatment for each of Examples and Comparative Examples are shown in Table 2.

TABLE 1

| | | | Activation agent | | | | Heating conditions | | |
|---|---|---|---|---|---|---|---|---|---|
| | Active material | Weight ratio of mixture Active material/ binder/ conductive material | Alkali metal compound | Number of moles of each component with respect to 1 mol of active material | pH | Melting start Temperature | Temperature | Total pressure (atm) | Oxygen concentration | Oxygen partial pressure (atm) |
| Example 1 | $Li_{1.06}Ni_{0.80}Co_{0.11}Mn_{0.09}O_2$ | 92/3/5 | $Li_2CO_3$ $K_2CO_3$ | 0.1 0.1 | 11 | 490° C. | 750° C. | 1.0 | 100% | 1.0 |
| Comparative Example 1 | $Li_{1.06}Ni_{0.80}Co_{0.11}Mn_{0.09}O_2$ | 92/3/5 | None | None | — | — | 750° C. | 1.0 | 100% | 1.0 |
| Example 2 | $Li_{1.06}Ni_{0.80}Co_{0.11}Mn_{0.09}O_2$ | 92/3/5 | $Li_2CO_3$ $K_2SO_4$ | 0.1 0.1 | 11 | 550° C. | 750° C. | 1.0 | 50% | 0.5 |
| Comparative Example 2 | $Li_{1.06}Ni_{0.80}Co_{0.11}Mn_{0.09}O_2$ | 92/3/5 | None | None | — | — | 750° C. | 1.0 | 50% | 0.5 |
| Comparative Example 3 | $Li_{1.06}Ni_{0.80}Co_{0.11}Mn_{0.09}O_2$ | 92/3/5 | $Li_2CO_3$ $K_2CO_3$ | 0.1 0.1 | 11 | 490° C. | 750° C. | 1.0 | 20% | 0.2 |
| Comparative Example 4 | $Li_{1.06}Ni_{0.80}Co_{0.11}Mn_{0.09}O_2$ | 92/3/5 | None | None | — | — | 750° C. | 1.0 | 20% | 0.2 |
| Example 3 | $Li_{1.06}Ni_{0.80}Co_{0.11}Mn_{0.09}O_2$ | 92/3/5 | $Na_2SO_4$ $K_2CO_3$ | 0.1 0.1 | 11 | 700° C. | 750° C. | 1.0 | 100% | 1.0 |
| Example 4 | $Li_{1.06}Ni_{0.80}Co_{0.11}Mn_{0.09}O_2$ | 92/3/5 | $Li_2CO_3$ $K_2SO_4$ | 0.1 0.1 | 11 | 550° C. | 750° C. | 1.0 | 100% | 1.0 |
| Example 5 | $Li_{1.06}Ni_{0.80}Co_{0.11}Mn_{0.09}O_2$ | 92/3/5 | $Li_2CO_3$ $Na_2SO_4$ $K_2CO_3$ | 0.1 0.1 0.1 | 11 | 490° C. | 750° C. | 1.0 | 100% | 1.0 |
| Example 6 | $Li_{1.04}Ni_{0.34}Co_{0.33}Mn_{0.33}O_2$ | 92/3/5 | $Li_2CO_3$ $K_2SO_4$ | 0.1 0.1 | 11 | 550° C. | 750° C. | 1.0 | 100% | 1.0 |
| Example 7 | $Li_{1.04}Ni_{0.34}Co_{0.33}Mn_{0.33}O_2$ | 92/3/5 | $Li_2CO_3$ $K_2SO_4$ | 0.1 0.1 | 11 | 550° C. | 750° C. | 1.0 | 50% | 0.5 |

TABLE 2

| | (110) Interplanar spacing (Å) | | | Discharge capacity (mAh/g) | |
|---|---|---|---|---|---|
| Table 2 | Active material Before treatment | Active material After treatment | Ratio | Active material Before treatment | Active material After treatment |
| Example 1 | 1.4360 | 1.4384 | 0.16% | 184 | 162 |
| Comparative Example 1 | 1.4360 | No peak | — | 184 | 101 |
| Example 2 | 1.4360 | 1.4380 | 0.14% | 184 | 160 |

TABLE 2-continued

| Table 2 | (110) Interplanar spacing (Å) | | | Discharge capacity (mAh/g) | |
|---|---|---|---|---|---|
| | Active material Before treatment | Active material After treatment | Ratio | Active material Before treatment | Active material After treatment |
| Comparative Example 2 | 1.4360 | No peak | — | 184 | 40 |
| Comparative Example 3 | 1.4360 | 1.4420 | 0.42% | 184 | 46 |
| Comparative Example 4 | 1.4360 | 1.4440 | 0.56% | 184 | 113 |
| Example 3 | 1.4360 | 1.4410 | 0.35% | 184 | 138 |
| Example 4 | 1.4360 | 1.4390 | 0.21% | 184 | 167 |
| Example 5 | 1.4360 | 1.4390 | 0.21% | 184 | 162 |
| Example 6 | 1.4307 | 1.4297 | −0.07% | 150 | 142 |
| Example 7 | 1.4307 | 1.4340 | 0.23% | 150 | 135 |

In the Examples, it was confirmed that the amount of change in the (110) interplanar spacing was smaller, and deterioration of the crystal structure was smaller. On the other hand, in the Comparative Examples, it was confirmed that the amount of change in the (110) interplanar spacing was larger, and deterioration of the crystal structure was larger. The discharge capacity also exhibited a similar tendency.

The invention claimed is:

1. A method for manufacturing a reproduced active material, the method comprising:
    (1) mixing an activation agent containing one kind or two or more kinds of alkali metal compounds into an electrode mixture containing an active material and a binder to form a mixture;
    (2) heating the mixture to a temperature higher than or equal to a melting start temperature of the activation agent in an atmosphere having an oxygen partial pressure of 0.3 atm or higher; and
    (3) collecting the reproduced active material from the mixture after heating by a slurrification and solid-liquid separation method or a vaporization and separation method.

2. The method according to claim 1, wherein the reproduced active material is a positive electrode active material.

3. The method according to claim 2, wherein the positive electrode active material is a positive electrode active material of a non-aqueous secondary battery.

4. The method according to claim 1, wherein the active material in the electrode mixture is a composite oxide containing one or more kinds of elements selected from the following Element Group 1 and one or more kinds of elements selected from Element Group 2:

Element Group 1: Ni, Co, Mn, Fe, Al, and P
Element Group 2: Li, Na, K, Ca, Sr, Ba, and Mg.

5. The method according to claim 1, wherein the active material in the electrode mixture is a composite oxide represented by $Li_{1+a}M^2_bM^1M^T_cO_{2+d}X_e$,
    provided that $M^2$ represents at least one or more elements selected from the group consisting of Na, K, Ca, Sr, Ba, and Mg;
    $M^1$ represents at least one kind of element selected from the group consisting of Ni, Co, Mn, Fe, Al, and P;
    $M^T$ represents at least one element selected from the group consisting of transition metal elements other than Ni, Co, Mn, and Fe;
    X represents at least one or more elements selected from the group consisting of non-metal elements except for oxygen O and P; and
    the following are satisfied: $-0.4<a<1.5$, $0\leq b<0.5$, $0\leq c<0.5$, $-0.5<d<1.5$, and $0\leq e<0.5$.

6. The method according to claim 5, wherein a molar fraction of Ni included in $M^1$ in the composite oxide is 0.5 or more.

7. The method according to claim 4, wherein the composite oxide has a hexagonal crystal structure.

8. The method according to claim 1, wherein a discharge capacity of the collected active material is 150 mAh/g or greater.

9. The method according to claim 1, wherein the at least one kind of alkali metal compound contained in the activation agent is the same alkali metal element as the alkali metal element contained in the active material.

10. The method according to claim 1, wherein at least one kind of the alkali metal compound contained in the activation agent is an alkali metal compound exhibiting alkalinity when dissolved in water.

11. The method according to claim 10, wherein the alkali metal compound exhibiting alkalinity when dissolved in water is one or more kinds selected from the group consisting of hydroxides, carbonates, hydrogen carbonates, oxides, peroxides, and superoxides of alkali metals.

12. The method according to claim 1, wherein the melting start temperature of the activation agent is 700° C. or lower.

13. The method according to claim 1, wherein, before mixing the activation agent and the electrode mixture, particles of the active material are bound to each other by the binder in the electrode mixture.

14. The method according to claim 1, wherein the binder is a thermoplastic resin.

15. The method according to claim 1, wherein the binder is a fluororesin.

* * * * *